United States Patent
Jian et al.

(10) Patent No.: US 10,819,005 B2
(45) Date of Patent: Oct. 27, 2020

(54) CONVERTIBLE MOBILE DEVICE

(71) Applicant: Wistron NeWeb Corp., Hsinchu (TW)

(72) Inventors: Hong-Jun Jian, Hsinchu (TW); Yu-Sheng Fan, Hsinchu (TW)

(73) Assignee: WISTRON NEWEB CORP., Hsinchu (TW)

( * ) Notice: Subject to any disclaimer, the term of this patent is extended or adjusted under 35 U.S.C. 154(b) by 14 days.

(21) Appl. No.: 16/392,882

(22) Filed: Apr. 24, 2019

(65) Prior Publication Data
US 2019/0348745 A1 Nov. 14, 2019

(30) Foreign Application Priority Data
May 14, 2018 (TW) .............................. 107116286 A

(51) Int. Cl.
| | |
|---|---|
| *H01Q 1/22* | (2006.01) |
| *H04B 1/3827* | (2015.01) |
| *H01Q 5/35* | (2015.01) |
| *H01Q 1/24* | (2006.01) |
| *G06F 1/16* | (2006.01) |
| *H01Q 9/06* | (2006.01) |

(Continued)

(52) U.S. Cl.
CPC ......... *H01Q 1/2266* (2013.01); *G06F 1/1616* (2013.01); *G06F 1/1681* (2013.01); *H01Q 1/243* (2013.01); *H01Q 1/52* (2013.01); *H01Q 5/35* (2015.01); *H01Q 9/06* (2013.01); *H04B 1/3827* (2013.01); *H04M 1/0216* (2013.01)

(58) Field of Classification Search
CPC ........ H01Q 1/2266; H01Q 13/10; H01Q 5/35; H01Q 1/243; H01Q 9/06; H01Q 1/52; H04B 1/3827; G06F 1/1681; G06F 1/1616; G06F 1/1698; H04M 1/0216; H04M 1/0214
See application file for complete search history.

(56) References Cited

U.S. PATENT DOCUMENTS

| | | | |
|---|---|---|---|
| 10,056,696 B2 * | 8/2018 | Tseng | H01Q 1/36 |
| 2010/0103069 A1 * | 4/2010 | Wang | H01Q 9/42 |
| | | | 343/846 |

(Continued)

FOREIGN PATENT DOCUMENTS

| | | |
|---|---|---|
| CN | 107689485 A | 2/2018 |
| TW | M537316 U | 2/2017 |

*Primary Examiner* — Daniel D Chang
(74) *Attorney, Agent, or Firm* — McClure, Qualey & Rodack, LLP

(57) ABSTRACT

A convertible mobile device includes an upper cover, a base, a hinge element, a supporting element, an antenna structure, and a cover element. The hinge element is connected between the upper cover and the base, so that the convertible mobile device can flip over and operate in a notebook mode or a tablet mode. The antenna structure is disposed on the supporting element. The antenna structure includes a first radiation element and a second radiation element. One of the first radiation element and the second radiation element has a positive feeding point, and the other of the first radiation element and the second radiation element has a negative feeding point. A coupling gap is formed between the first radiation element and the second radiation element. The cover element covers the supporting element, the antenna structure, and at least a portion of the hinge element.

17 Claims, 8 Drawing Sheets

(51) Int. Cl.
*H01Q 1/52* (2006.01)
*H04M 1/02* (2006.01)

(56) References Cited

U.S. PATENT DOCUMENTS

2017/0365930 A1    12/2017  Nishioka
2018/0040942 A1*    2/2018  Lepe .................... H01Q 1/2266

* cited by examiner

CONVERTIBLE MOBILE DEVICE

CROSS REFERENCE TO RELATED APPLICATIONS

This application claims priority of Taiwan Patent Application No. 107116286 filed on May 14, 2018, the entirety of which is incorporated by reference herein.

BACKGROUND OF THE INVENTION

Field of the Invention

The disclosure generally relates to a convertible mobile device, and more particularly, it relates to a convertible mobile device and an antenna structure therein.

Description of the Related Art

With the advancements being made in mobile communication technology, mobile devices such as portable computers, mobile phones, multimedia players, and other hybrid functional portable electronic devices have become more common. To satisfy user demand, mobile devices can usually perform wireless communication functions. Some devices cover a large wireless communication area; these include mobile phones using 2G, 3G, and LTE (Long Term Evolution) systems and using frequency bands of 700 MHz, 850 MHz, 900 MHz, 1800 MHz, 1900 MHz, 2100 MHz, 2300 MHz, 2500 MHz, and 2700 MHz. Some devices cover a small wireless communication area; these include mobile phones using Wi-Fi and Bluetooth systems and using frequency bands of 2.4 GHz, 5.2 GHz, and 5.8 GHz.

Antennas are indispensable components for mobile devices supporting wireless communication. However, antennas tend to be affected by nearby metal elements. For example, when convertible mobile devices operate in different modes, the relative positions of inner antenna elements and metal elements may change, affecting the antenna elements and decreasing the overall communication quality. As a result, there is a need to propose a novel solution for overcoming the problem of the prior art.

BRIEF SUMMARY OF THE INVENTION

In an exemplary embodiment, the disclosure is directed to a convertible mobile device including an upper cover, a base, a hinge element, a supporting element, an antenna structure, and a cover element. The hinge element is connected between the upper cover and the base, so that the convertible mobile device is capable to be flipped to operate in a notebook mode or a tablet mode. The antenna structure is disposed on the supporting element. The antenna structure includes a first radiation element and a second radiation element. The first radiation element and the second radiation element have a positive feeding point and a negative feeding point. The first radiation element includes a first geometric element, a second geometric element, and a third geometric element. A vertical axis of the first geometric element is parallel to a side of the second radiation element. The second geometric element is connected to the first geometric element. A vertical axis of the second geometric element is perpendicular to the vertical axis of the first geometric element. The second geometric element is indirectly or directly connected to a first side of the third geometric element. A gap is formed between a second side of the third geometric element and the second radiation element. Extension lines of the first side and the second side of the third geometric element are perpendicular to each other. The second geometric element has two sides which are opposite to each other. A central extension line is formed between the two sides. The central extension line has equal vertical distances to the two sides. The vertical distance between central extension line and one of the two sides is shorter than 90% of a vertical distance between the central extension line and the second side of the third geometric element. The cover element covers the supporting element, the antenna structure, and at least a portion of the hinge element.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

In order to illustrate the purposes, features and advantages of the invention, the embodiments and figures of the invention are shown in detail as follows.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

Figure 1A:
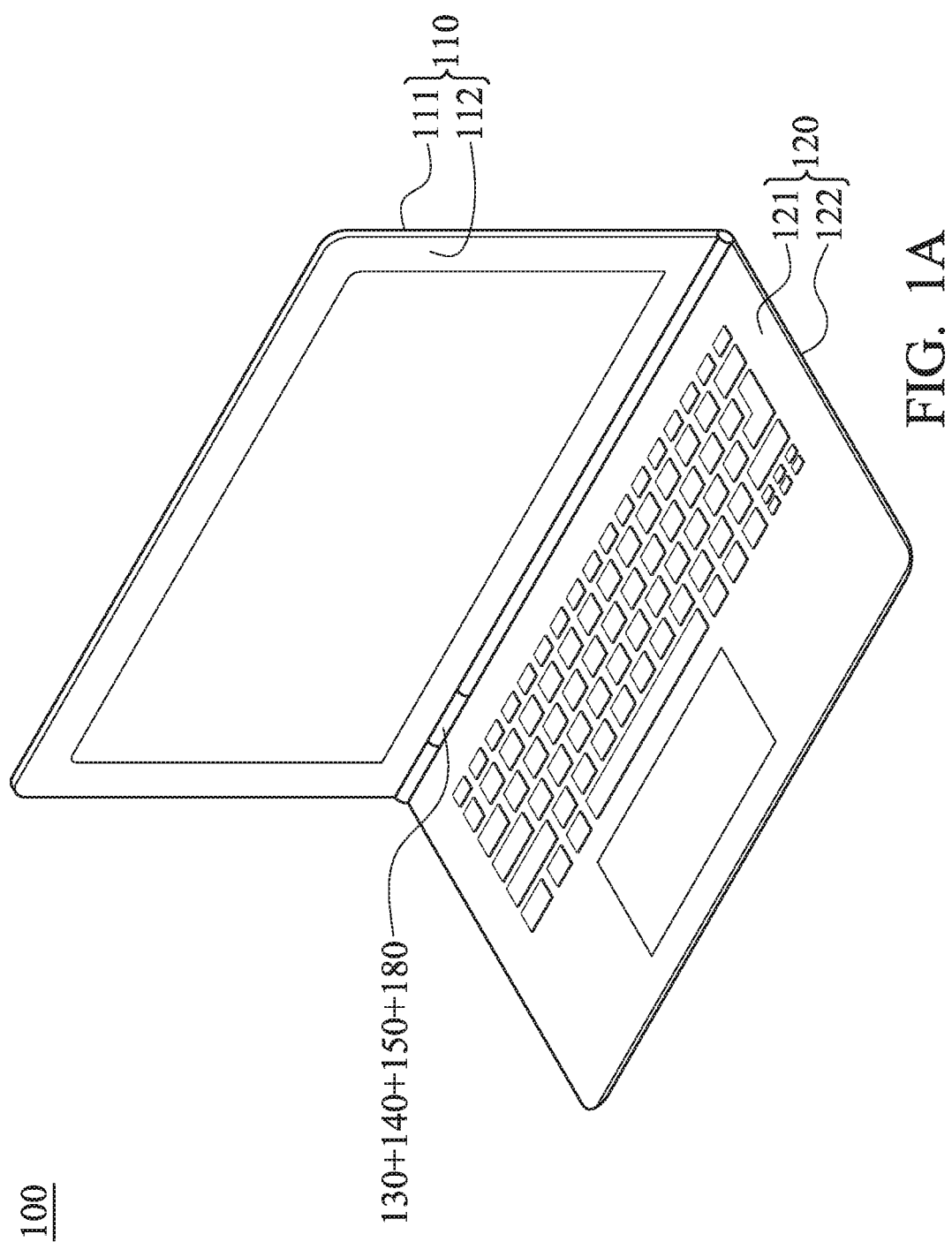
FIG. 1A is a perspective view of a convertible mobile device according to an embodiment of the invention.
Figure 1B:
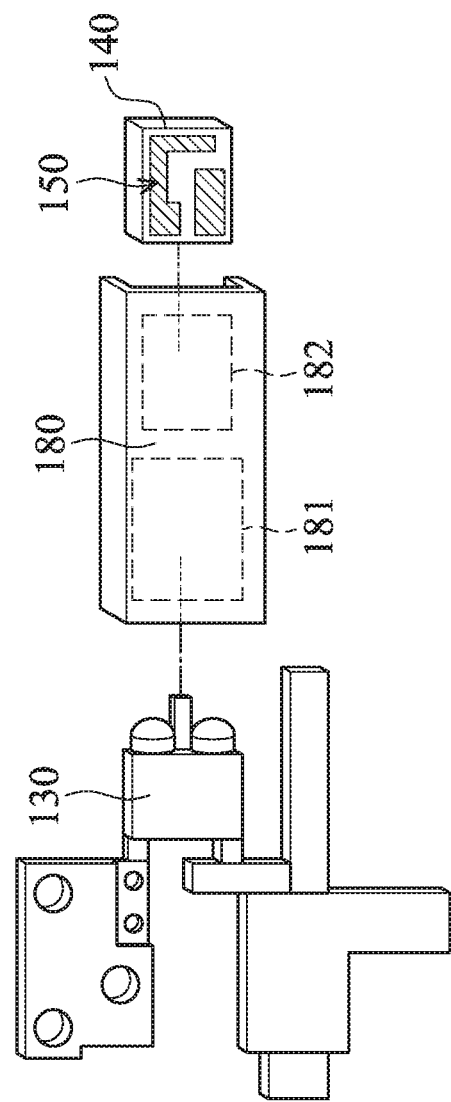
FIG. 1B is an exploded view of a hinge element, a supporting element, an antenna element, and a cover element according to an embodiment of the invention.
Figure 1C:
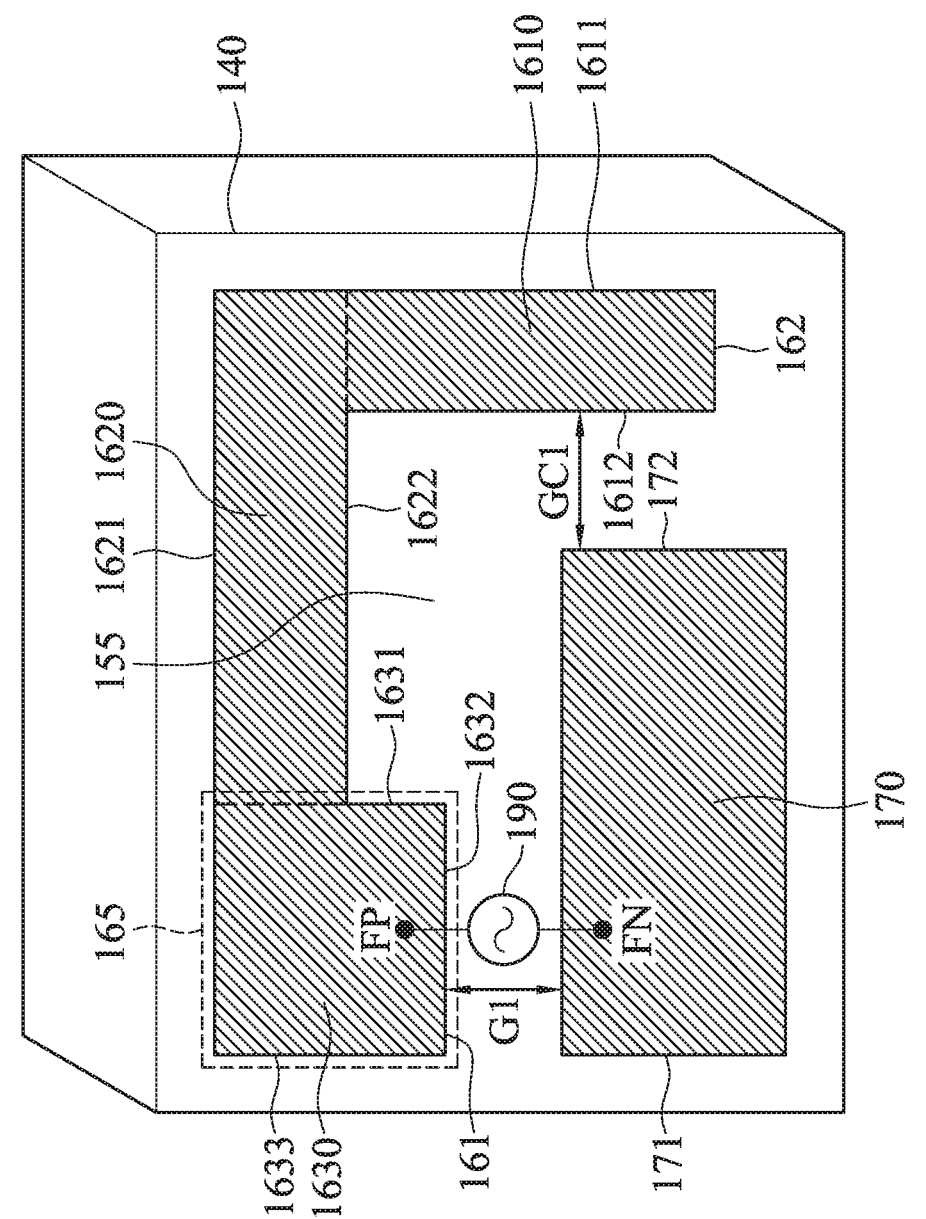
FIG. 1C is a top view of an antenna structure and a supporting element according to an embodiment of the invention.

FIG. 1A is a perspective view of a convertible mobile device 100 according to an embodiment of the invention. The convertible mobile device 100 can operate in a notebook mode or a tablet mode. In the embodiment of FIG. 1A, the convertible mobile device 100 includes an upper cover 110, a base 120, a hinge element 130, a supporting element 140, an antenna structure 150, and a cover element 180. FIG. 1B is an exploded view of the hinge element 130, the supporting element 140, the antenna structure 150, and the cover element 180 according to an embodiment of the invention. FIG. 1C is a top view of the antenna structure 150 and the supporting element 140 according to an embodiment of the invention. Please refer to FIG. 1A, FIG. 1B, and FIG. 1C together. It should be understood that the convertible mobile device 100 may further include other components, such as a touch control panel, a processor, a battery module, and an input/output device, although they are not displayed in FIG. 1A, FIG. 1B, and FIG. 1C.

The upper cover 110 may include an upper cover housing 111, and a display frame 112 which is opposite to the upper cover housing 111. A display device may be embedded in the display frame 112. The base 120 may include a frame 121, and a base housing 122 which is opposite to the frame 121. For example, the frame 121 may be a keyboard frame, and a keyboard may be embedded in the keyboard frame 121. It should be understood that the upper cover housing 111, the display frame 112, the keyboard frame 121, and the base housing 122 may respectively mean the so-called "A component", "B-component", "C-component", and "D-component" of the notebook manufacturing industry. The hinge element 130 is connected between the upper cover 110 and the base 120. By using the hinge element 130, the convertible mobile device 100 can selectively flip over and operate in either the notebook mode or the tablet mode.

The supporting element 140 may be made of a nonconductive material, such as a plastic material. The shape and type of the supporting element 140 are not limited in the invention. The antenna structure 150 may be made of a metal material, such as copper, silver, aluminum, iron, or their alloys. The antenna structure 150 is disposed on the supporting element 140. In some embodiments, the antenna structure 150 is formed on the supporting element 140 using LDS (Laser Direct Structuring) technology.

Please refer to FIG. 1B. The cover element 180 is configured to cover the supporting element 140, the antenna structure 150, and at least a portion of the hinge element 130. For example, the cover element 180 may have an internal hollow portion, and the internal hollow portion may be divided into a first region 181 and a second region 182 adjacent to each other. At least one portion of the hinge element 130 may be positioned in the first region 181. The supporting element 140 and the antenna structure 150 may be positioned in the second region 182. In some embodiments, the cover element 180 is affixed onto the hinge element 130 by a screw. In alternative embodiments, the cover element 180 is further affixed onto the supporting element 140 by another screw and a slot wedge. Since the cover element 180 is made of a nonconductive material, it does not interfere with the radiation pattern of the antenna structure 150, and the structure and shape of the cover element 180 are not limited. The structure and shape of the cover element 180 displayed in this figure are referred by the relative positions of the antenna structure 150 and the hinge element 130. Such a design integrating the antenna structure 150 with the hinge element 130 and the cover element 180 can help to minimize the whole antenna size.

Please refer to FIG. 1C. The antenna structure 150 includes a first radiation element 160 and a second radiation element 170. The first radiation element 160 has a positive feeding point FP, and the second radiation element 170 has a negative feeding point FN. A coupling gap GC1 is formed between the first radiation element 160 and the second radiation element 170. In some embodiments, the antenna structure 150 further includes a signal source 190 and a coaxial cable (not shown). The signal source 190 may be an RF (Radio Frequency) module. A positive electrode of the signal source 190 may be coupled through a central conductive line of the coaxial cable to the positive feeding point FP, and a negative electrode of the signal source 190 may be coupled through a conductive housing of the coaxial cable to the negative feeding point FN, so as to excite the antenna structure 150.

The first radiation element 160 may substantially have an L-shape. Specifically, the first radiation element 160 has a first end 161 and a second end 162. The positive feeding point FP is substantially positioned adjacent to the first end 161 of the first radiation element 160. The second end 162 of the first radiation element 160 is open, and a portion of the first radiation element 160 close to the second end 162 defines the coupling gap GC1 with the second radiation element 170. The second radiation element 170 may substantially has a straight-line shape. Specifically, the second radiation element 170 has a first end 171 and a second end 172. The negative feeding point FN is substantially positioned adjacent to the first end 171 of the second radiation element 170. The second end 172 of the second radiation element 170 is open and defines the coupling gap GC1 with such portion of the first radiation element 160 close to the second end 162. It should be noted that the term "adjacent" or "close" over the disclosure means that the distance (spacing) between two corresponding elements is smaller than a predetermined distance (e.g., 5 mm or the shorter), or means that the two corresponding elements directly touch each other (i.e., the aforementioned distance/spacing therebetween is reduced to 0).

In some embodiments, the length of the first radiation element 160 (i.e., the length from the first end 161 to the second end 162) is longer than the length of the second radiation element 170 (i.e., the length from the first end 171 to the second end 172), and the width of the first radiation element 160 is shorter than the width of the second radiation element 170. A non-metal region 155 may be at least partially or completely surrounded by the first radiation element 160 and the second radiation element 170. For example, the non-metal region 155 may substantially have an L-shape, but it is not limited thereto. The non-metal region 155 may be connected to the coupling gap GC1, such that the first radiation element 160 may be completely separated from the second radiation element 170 by the non-metal region 155. In some embodiments, the first radiation element 160 further include a terminal bending portion 165 which is positioned at the first end 161 of the first radiation element 160, and thus the first radiation element 160 may substantially have a J-shape. It should be understood that the terminal bending portion 165 is an optional element. In other embodiments, the terminal bending portion 165 is removed from the first radiation element 160.

In some embodiments, when the first radiation element 160 has the positive feeding point FP, the second radiation element 170 has the negative feeding point FN. In alternative embodiments, when the first radiation element 160 has the negative feeding point FN, the second radiation element 170 has the positive feeding point FP.

In some embodiments, the first radiation element 160 includes a first geometric element 1610, a second geometric element 1620, and a third geometric element 1630. A vertical axis of the first geometric element 1610 is parallel to a side of the second radiation element 170. The second geometric element 1620 is connected to the first geometric element 1610. A vertical axis of the second geometric element 1620 is perpendicular to the vertical axis of the first geometric element 1610. The second geometric element 1620 is indirectly or directly connected to a first side 1631 of the third geometric element 1630. A gap G1 is formed between a second side 1632 of the third geometric element 1630 and the second radiation element 170. The extension lines of the first side 1631 and the second side 1632 of the third geometric element 1630 are perpendicular to each other. The second geometric element 1620 has two sides 1621 and 1622 which are opposite to each other. A central extension line is formed between the two sides 1621 and 1622 (e.g., when the second geometric element 1620 has a rectangular shape, the aforementioned central extension line may be the same as the vertical axis of the second geometric element 1620). The central extension line has equal vertical distances to the two sides 1621 and 1622. The vertical distance between the central extension line and one of the two sides 1621 and 1622 is shorter than 90% of the vertical distance between the central extension line and the second side 1632 of the third geometric element 1630.

In some embodiments, the first geometric element 1610 has a first side 1611 and a second side 1612. The vertical axis of the first geometric element 1610 is positioned between the first side 1611 and the second side 1612 of the first geometric element 1610. The maximum distance between the first side 1611 and the second side 1612 of the first geometric element 1610 is shorter than 90% of the maximum distance between the first side 1631 and a third side 1633 of the third geometric element 1630. The first side 1631 and the third side 1633 of the third geometric element 1630 are opposite to each other.

Figure 2:
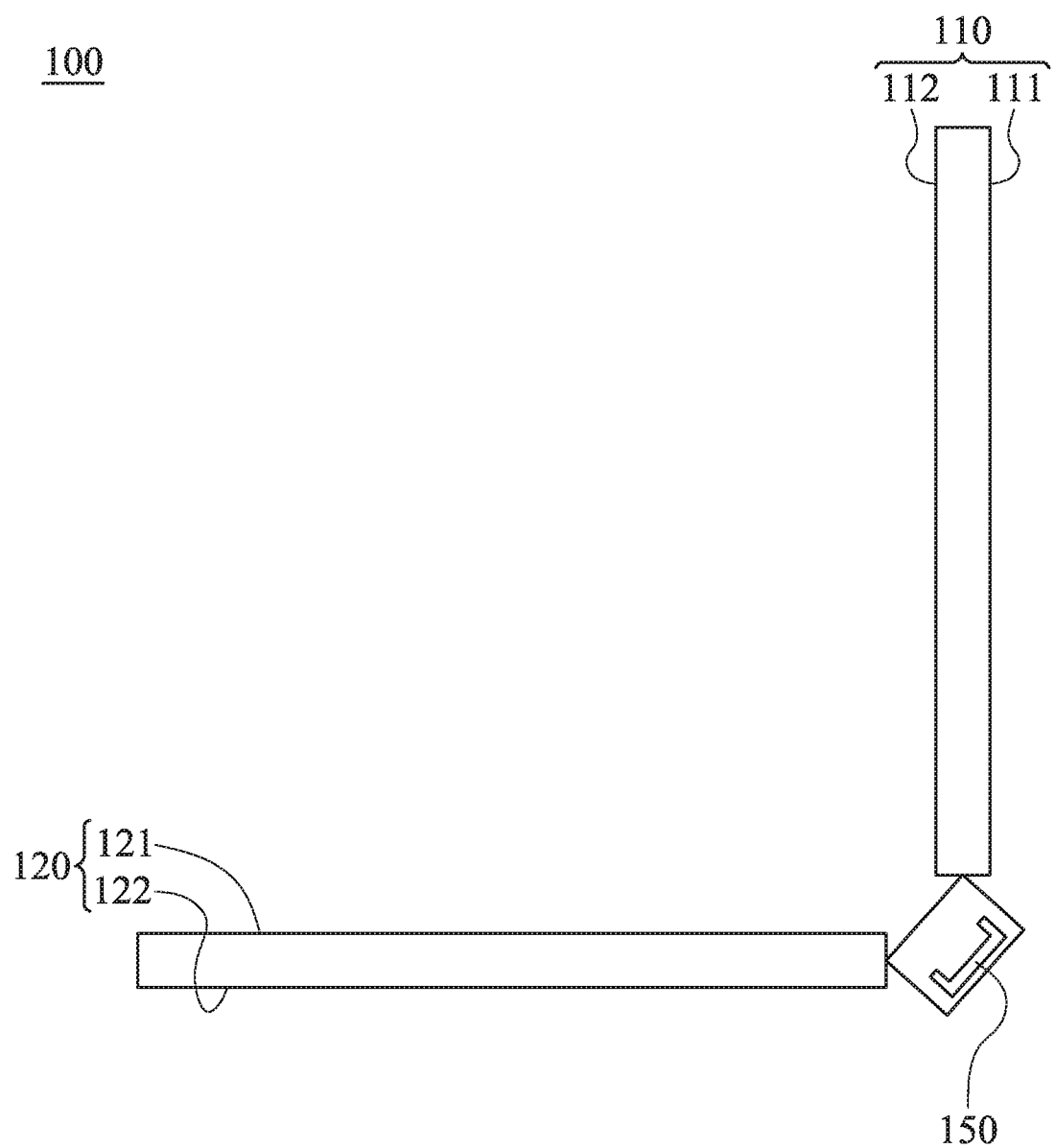
FIG. 2 is a diagram of a convertible mobile device operating in a notebook mode according to an embodiment of the invention.
Figure 3:
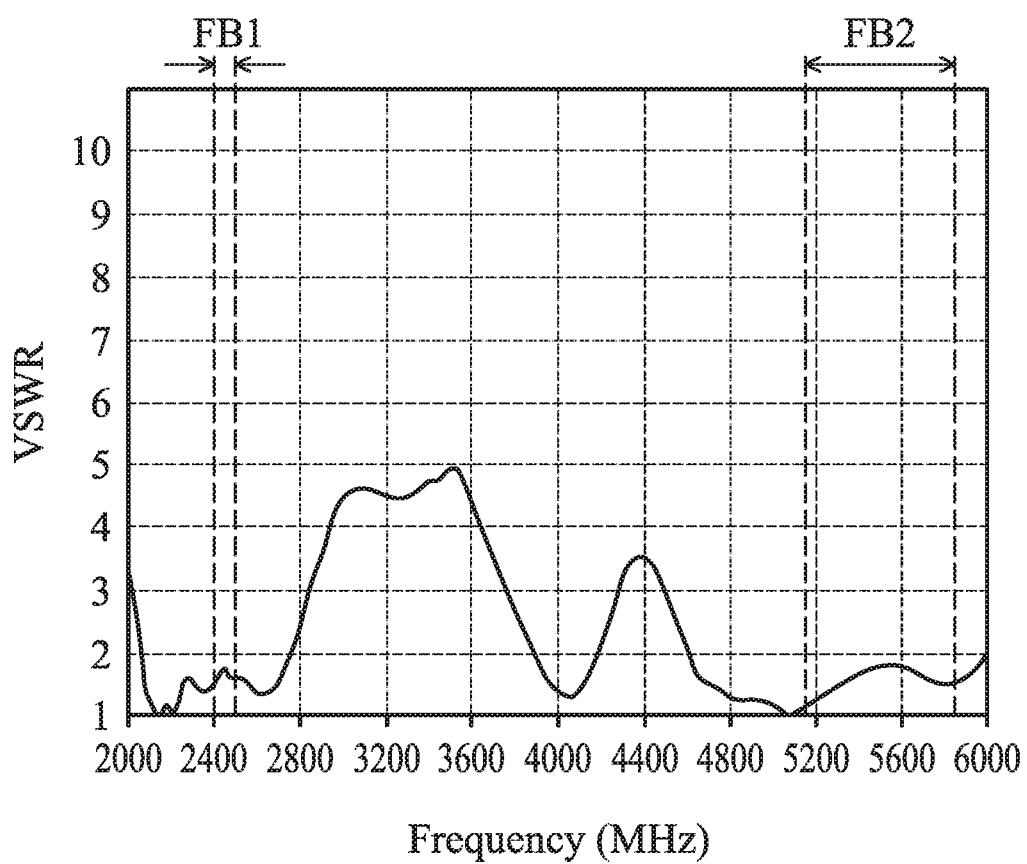
FIG. 3 is a diagram of VSWR (Voltage Standing Wave Ratio) of an antenna structure of a convertible mobile device operating in a notebook mode according to an embodiment of the invention.

FIG. 2 is a diagram of the convertible mobile device 100 operating in the notebook mode according to an embodiment of the invention. FIG. 3 is a diagram of VSWR (Voltage Standing Wave Ratio) of the antenna structure 150 of the convertible mobile device 100 operating in the notebook mode according to an embodiment of the invention. According to the measurement of FIG. 3, when the convertible mobile device 100 operates in the notebook mode, the antenna structure 150 can cover a first frequency band FB1 from 2400 MHz to 2500 MHz, and a second frequency band FB2 from 5150 MHz to 5850 MHz. The radiation efficiency of the antenna structure 150 is about −3.73 dB within the first frequency band FB1 and is about −3.77 dB within the second frequency band FB2. This can meet the requirement of practical applications of general mobile communication devices.

Figure 4:
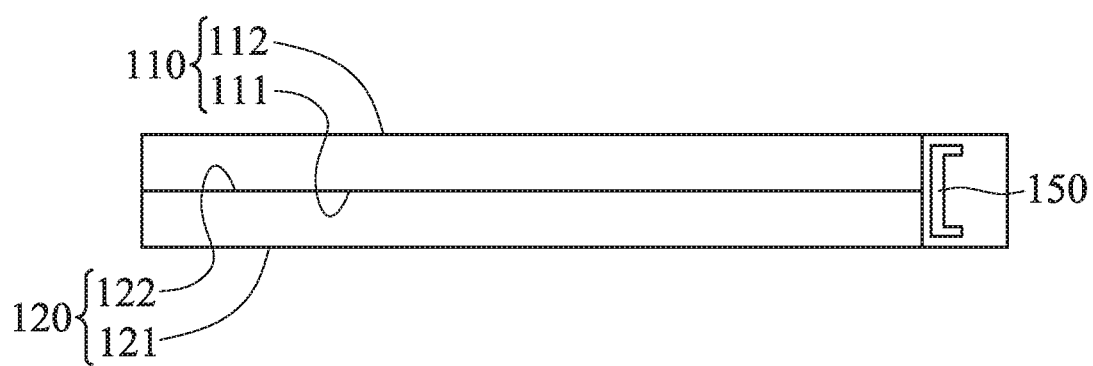
FIG. 4 is a diagram of a convertible mobile device operating in a tablet mode according to an embodiment of the invention.
Figure 5:
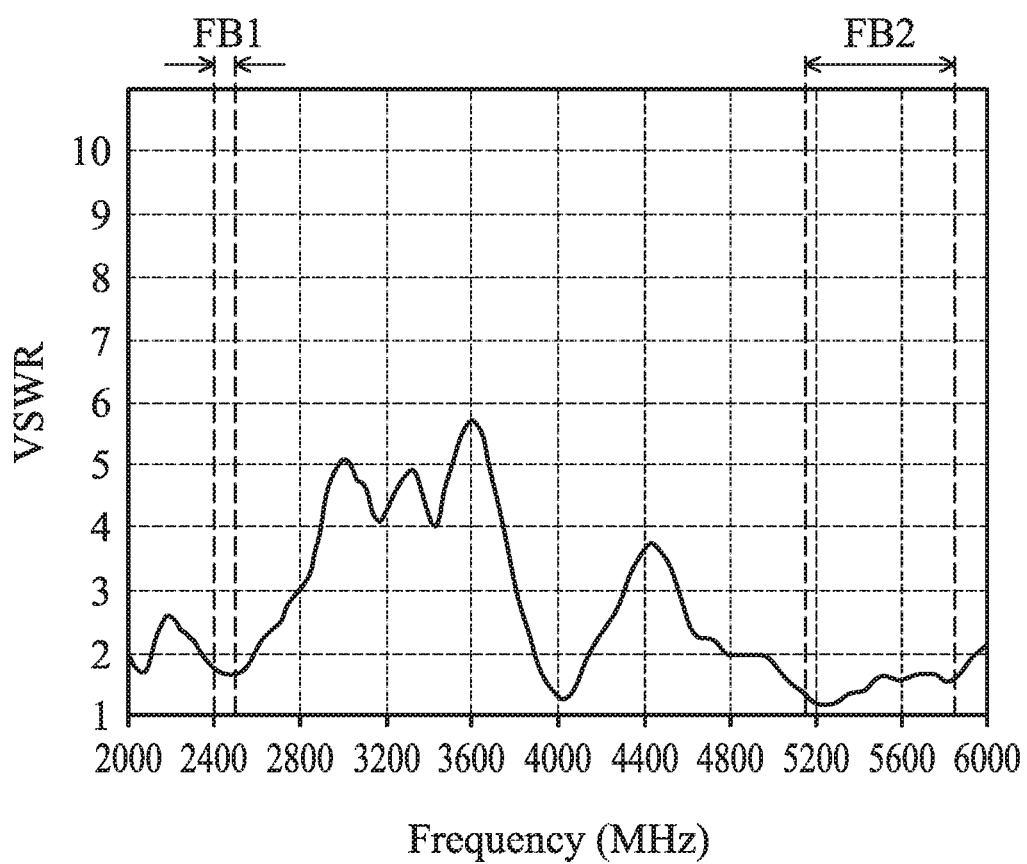
FIG. 5 is a diagram of VSWR of an antenna structure of a convertible mobile device operating in a tablet mode according to an embodiment of the invention.

FIG. 4 is a diagram of the convertible mobile device 100 operating in the tablet mode according to an embodiment of the invention. FIG. 5 is a diagram of VSWR of the antenna structure 150 of the convertible mobile device 100 operating in the tablet mode according to an embodiment of the invention. According to the measurement of FIG. 5, when the convertible mobile device 100 operates in the tablet mode, the antenna structure 150 can also cover the first frequency band FB1 from 2400 MHz to 2500 MHz, and the second frequency band FB2 from 5150 MHz to 5850 MHz. The radiation efficiency of the antenna structure 150 is about −5.05 dB within the first frequency band FB1 and is about −4.13 dB within the second frequency band FB2. This can meet the requirement of practical applications of general mobile communication devices.

As mentioned above, the antenna structure 150 is capable of supporting at least the dual wideband operations of WLAN (Wireless Local Area Network) 2.4 GHz/5 GHz, regardless of the convertible mobile device 100 operating in the notebook mode or the tablet mode. Specifically, when the convertible mobile device 100 operates in the notebook mode, the antenna structure 150 faces the outer side of the upper cover 110 and the base 120, and when the convertible mobile device 100 operates in the tablet mode, the antenna structure 150 faces the inner side (or the same side) of the upper cover 110 and the base 120. According to the practical measurement, such an antenna arrangement helps to reduce the SAR (Specific Absorption Rate) of the convertible mobile device 100 and increase the radiation efficiency of the antenna structure 150 (improved by about 20%).

In some embodiments, the operation principles of the antenna structure 150 of the convertible mobile device 100 are as follows. A coupling effect is induced between the first radiation element 160 and the second radiation element 170 because of the coupling gap GC1. The first radiation element 160 and the second radiation element 170 are excited to generate a fundamental resonant mode, thereby forming the aforementioned first frequency band FB1. The first radiation element 160 and the second radiation element 170 are further excited to generate a higher-order resonant mode, thereby forming the aforementioned second frequency band FB2. In addition, the second radiation element 170 may be independently excited, so as to increase the bandwidth of the aforementioned second frequency FB2.

In some embodiments, the element sizes of the convertible mobile device 100 are as follows. The total length of the first radiation element 160 and the second radiation element 170 may be shorter than 0.25 wavelength ($\lambda/4$) of the central frequency of the first frequency band FB1. The length of the second radiation element 170 may be substantially equal to 0.25 wavelength ($\lambda/4$) of the central frequency of the second frequency band FB2. The gap G1 between the first end 161 of the first radiation element 160 and the first end 171 of the second radiation element 170 may be shorter than 3 mm. The width of the coupling gap GC1 between the second end 162 of the first radiation element 160 and the second end 172 of the second radiation element 170 may be shorter than 3 mm. The above ranges of element sizes are calculated and obtained according to many experiment results, and they can optimize the operation frequency and the impedance matching of the antenna structure 150.

Generally, the total length of the antenna structure 150 is much shorter than 0.5 wavelength ($\lambda/2$) required to make a conventional dipole antenna or a conventional loop antenna. It should be noted that since there is no need to couple the antenna structure 150 to a system ground plane of the convertible mobile device 100, the antenna structure 150 does not tend to be affected and has low manufacturing complexity, and it is suitable for application in a variety of environments, such as a computer with a whole metal housing. Furthermore, the antenna structure 150 can maintain relatively high antenna stability without using any balun, and this can help to reduce the whole antenna manufacturing cost.

Figure 6:
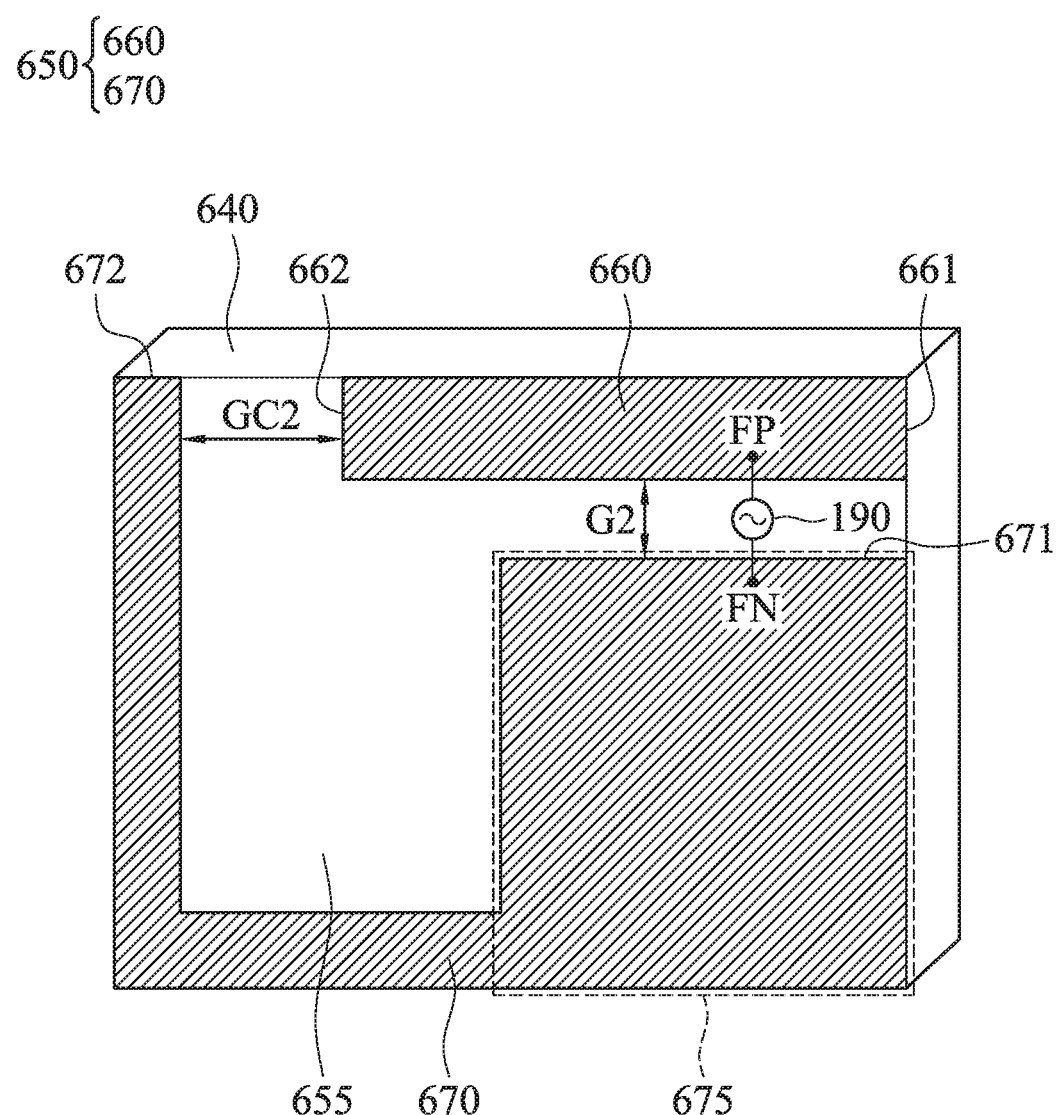
FIG. 6 is a top view of an antenna structure and a supporting element according to another embodiment of the invention.

FIG. 6 is a top view of an antenna structure 650 and a supporting element 640 according to another embodiment of the invention. The antenna structure 650 and the supporting element 640 can be applied to the convertible mobile device 100 of FIG. 1A, FIG. 1B, and FIG. 1C. FIG. 6 is similar to FIG. 1C. In the embodiment of FIG. 6, the antenna structure 650 is disposed on the supporting element 640. The antenna structure 650 includes a first radiation element 660 and a second radiation element 670. The first radiation element 660 may substantially have a straight-line shape. The first radiation element 660 has a first end 661 and a second end 662. A positive feeding point FP is substantially positioned at the first end 661 of the first radiation element 660. The second end 662 of the first radiation element 660 is open. The second radiation element 670 may substantially have an L-shape. The second radiation element 670 has a first end 671 and a second end 672. A negative feeding point FN is substantially positioned at the first end 671 of the second radiation element 670. The second end 672 of the second radiation element 670 is open. A gap G1 is formed between the first end 661 of the first radiation element 660 and the first end 671 of the second radiation element 670. A coupling gap GC2 is formed between the second end 662 of the first radiation element 660 and a portion close to the second end 672 of the second radiation element 670. The length of the first radiation element 660 (i.e., the length from the first end 661 to the second end 662) is shorter than the length of the second radiation element 670 (i.e., the length from the first end 671 to the second end 672). For example, the total length of the first radiation element 660 and the second radiation element 670 may be shorter than 0.25 wavelength ($\lambda/4$) of the central frequency of a first frequency band FB1 of the antenna structure 650, and the length of the first radiation element 660 may be substantially equal to 0.25 wavelength ($\lambda/4$) of the central frequency of a second frequency band FB2 of the antenna structure 650. A non-metal region 655 may be at least partially surrounded by the first radiation element 660 and the second radiation element 670. For example, the non-metal region 655 may substantially have a rectangular shape, but it is not limited thereto. The second radiation element 670 may further include a terminal widening portion 675 which is positioned at the first end 671 of the second radiation element 670, so as to increase the bandwidth of the antenna structure 650. It should be understood that the terminal widening portion 675 is an optional element. In other embodiments, the terminal widening portion 675 is removed from the second radiation element 670. The antenna structure 650 of FIG. 6 is considered as a modified embodiment of the antenna structure 150 of FIG. 1C. The antenna structure 650 of FIG. 6 substantially exchanges the positions of the positive feeding point FP and the negative feeding point FN, without affecting the performance of the invention.

The invention provides a novel convertible mobile device. In comparison to the conventional design, the invention has at least the following advantages of: (1) reducing the whole antenna size, (2) covering the wideband operations, (3) reducing the SAR, (4) increasing the antenna radiation efficiency, and (5) reducing the whole complexity and the manufacturing cost. Accordingly, the invention is suitable for application in a variety of convertible mobile communication devices to improve the communication quality thereof.

Note that the above element sizes, element shapes, and frequency ranges are not limitations of the invention. An antenna designer can fine-tune these settings or values according to different requirements. It should be understood that the convertible mobile device and antenna structure of the invention are not limited to the configurations of FIGS. 1-6. The invention may merely include any one or more features of any one or more embodiments of FIGS. 1-6. In other words, not all of the features displayed in the figures should be implemented in the convertible mobile device and antenna structure of the invention.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A convertible mobile device, comprising:
an upper cover;
a base;
a hinge element, connected between the upper cover and the base, so that the convertible mobile device is capable to be flipped to operate in a notebook mode or a tablet mode;
a supporting element;
an antenna structure, disposed on the supporting element, wherein the antenna structure comprises a first radiation element and a second radiation element, and wherein the first radiation element and the second radiation element have a positive feeding point and a negative feeding point;
wherein the first radiation element comprises a first geometric element, a second geometric element, and a third geometric element, a vertical axis of the first geometric element is parallel to a side of the second radiation element, the second geometric element is connected to the first geometric element, a vertical axis of the second geometric element is perpendicular to the vertical axis of the first geometric element, the second geometric element is indirectly or directly connected to a first side of the third geometric element, a gap is formed between a second side of the third geometric element and the second radiation element, and extension lines of the first side and the second side of the third geometric element are perpendicular to each other;
wherein the second geometric element has two sides which are opposite to each other, a central extension line is formed between the two sides, the central extension line has equal vertical distances to the two sides, and the vertical distance between the central extension line and one of the two sides is shorter than 90% of a vertical distance between the central extension line and the second side of the third geometric element; and
a cover element, covering the supporting element, the antenna structure, and at least a portion of the hinge element;
wherein the antenna structure covers a first frequency band from 2400 MHz to 2500 MHz, and a second frequency band from 5150 MHz to 5850 MHz;
wherein a total length of the first radiation element and the second radiation element is shorter than 0.25 wavelength of a central frequency of the first frequency band.

2. The convertible mobile device as claimed in claim 1, wherein the supporting element is made of a nonconductive material.

3. The convertible mobile device as claimed in claim 1, wherein the antenna structure is formed on the supporting element using LDS (Laser Direct Structuring) technology.

4. The convertible mobile device as claimed in claim 1, wherein the first geometric element has a first side and a second side, the vertical axis of the first geometric element is positioned between the first side and the second side of the first geometric element, a maximum distance between the first side and the second side of the first geometric element is shorter than 90% of a maximum distance between the first side and a third side of the third geometric element, and the first side and the third side of the third geometric element are opposite to each other.

5. The convertible mobile device as claimed in claim 1, wherein a coupling gap is formed between the first radiation element and the second radiation element, the first radiation element has a first end and a second end, the positive feeding point or the negative feeding point is positioned at the first end of the first radiation element, and the second end of the first radiation element is open and a portion of the first radiation element close to the second end defines the coupling gap with the second radiation element.

6. The convertible mobile device as claimed in claim 5, wherein the second radiation element has a first end and a second end, the negative feeding point or the positive feeding point is positioned adjacent to the first end of the second radiation element, and the second end of the second radiation element is open and defines the coupling gap with the portion of the first radiation element.

7. The convertible mobile device as claimed in claim 5, wherein a width of the coupling gap is shorter than 3 mm.

8. The convertible mobile device as claimed in claim 1, wherein the first radiation element substantially has an L-shape.

9. The convertible mobile device as claimed in claim 1, wherein the second radiation element substantially has a straight-line shape.

10. The convertible mobile device as claimed in claim 1, wherein the second radiation element substantially has an L-shape.

11. The convertible mobile device as claimed in claim 1, wherein a length of the first radiation element is longer than a length of the second radiation element.

12. The convertible mobile device as claimed in claim 1, wherein a non-metal region is at least partially surrounded by the first radiation element and the second radiation element.

13. The convertible mobile device as claimed in claim 12, wherein the non-metal region substantially has an L-shape, a T-shape, or a rectangular shape.

14. The convertible mobile device as claimed in claim 1, wherein the first radiation element and the second radiation element are excited to generate a fundamental resonant mode, thereby forming the first frequency band.

15. The convertible mobile device as claimed in claim 1, wherein the first radiation element and the second radiation element are further excited to generate a higher-order resonant mode, thereby forming the second frequency band.

16. The convertible mobile device as claimed in claim 1, wherein a length of the first radiation element or the second radiation element is equal to 0.25 wavelength of a central frequency of the second frequency band.

17. The convertible mobile device as claimed in claim 1, wherein the cover element is made of a nonconductive material.

\* \* \* \* \*